United States Patent [19]

Turner, Jr.

[11] Patent Number: 4,468,317

[45] Date of Patent: * Aug. 28, 1984

[54] SELECTIVE RHEOLOGICAL SEPARATION OF CLAYS

[75] Inventor: Ralph E. Turner, Jr., Tennille, Ga.

[73] Assignee: Anglo-American Clays Corporation, Sandersville, Ga.

[*] Notice: The portion of the term of this patent subsequent to Jun. 15, 1999 has been disclaimed.

[21] Appl. No.: 372,188

[22] Filed: Apr. 26, 1982

Related U.S. Application Data

[63] Continuation-in-part of Ser. No. 216,652, Dec. 15, 1980, Pat. No. 4,334,985.

[51] Int. Cl.³ .............................................. B03B 1/00
[52] U.S. Cl. ...................................... 209/5; 209/166; 501/148
[58] Field of Search ................. 209/5, 10, 9, 166, 167; 106/288 B; 501/146, 148, 145

[56] References Cited

U.S. PATENT DOCUMENTS

| | | | |
|---|---|---|---|
| 2,158,987 | 5/1939 | Maloney | 209/5 |
| 2,981,630 | 4/1961 | Rowland | 209/5 |
| 3,596,760 | 8/1971 | Jacobs et al. | 209/5 |
| 3,736,165 | 5/1973 | Sawyer | 209/5 |
| 3,808,021 | 4/1974 | Maynard | 106/288 B |
| 3,857,781 | 12/1974 | Maynard | 209/5 |
| 4,105,466 | 8/1978 | Kunkle et al. | 501/148 |
| 4,334,985 | 6/1982 | Turner | 209/5 |

Primary Examiner—Bernard Nozick
Attorney, Agent, or Firm—Stefan J. Klauber

[57] ABSTRACT

A method for continuously processing a kaolin clay which has relatively poor high-shear viscosity when prepared as a high-solids suspension, so as to obtain therefrom a fraction having a value of high-shear viscosity in high-solids suspension which is low relative to the starting clay, thereby being desirable for use in coating of paper. The method comprises the steps of forming the kaolin clay into a dilute aqueous suspension having from 10% to 20% solids by weight and forming said suspension into a continuous flow stream; mixing the stream of flowing suspension at a given point with from about 0.001% to 0.1% by weight of dry clay, of a high molecular weight anionic polyacrylamide polymer or derivative thereof, to selectively flocculate aggregates of minute kaolin platelets; and continuously separating the treated suspension downstream of the mixing point, into a sedimented phase containing a clay fraction of relatively high high-shear viscosity characteristics and a supernatant phase which is substantially free of aggregates and which contains in suspension as product, a fraction of the clay possessing relatively low high-shear viscosity properties.

13 Claims, 4 Drawing Figures

|← →|
0.5μ

SELECTIVE RHEOLOGICAL SEPARATION OF CLAYS

This application is a continuation-in-part of my co-pending application, Ser. No. 216,652 now U.S. Pat. No. 4,334,985, filed Dec. 15, 1980.

BACKGROUND OF INVENTION

This invention relates generally to kaolin clays, and more specifically relates to a method for processing a kaolin clay which has relatively poor high-shear viscosity when prepared as a high solids suspension, so as to obtain therefrom a fraction having a value of high-shear viscosity in high solids suspension which is low relative to the starting clay, thereby rendering same more suitable for paper and paperboard coating applications.

Kaolin clay coating pigments having very fine particle size and high brightness characteristics, are widely utilized in the coating of merchant grade papers and various types of paperboard wherein high gloss and smoothness of coating is required. Typically, these pigments are applied as a high solids aqueous suspension, i.e., a suspension including from approximately 60–75% by weight of clay solids. The size distribution of prior art pigments used for such purposes are usually such that of the order of 90–100% by weight thereof are of less than 2 microns equivalent spherical diameter (E.S.D.). Typically, further, the brightness characteristics, as measured by the standard specification established by TAPPI procedure T-646m-54, are of the order of at least 90.

Among the further qualities of a high solids coating clay slurry, which are of paramount importance for achieving high quality coatings, are the viscosity characteristics of same. It may be noted in this connection that the term "viscosity" as used herein with respect to clay slurries, refers to such characteristics as determined by the procedures of TAPPI Method T 648 su-72, as revised in 1972. This method sets forth specific procedures for determination of both the "low shear" and "high shear" viscosity. The latter, i.e. the high shear viscosity, is considered of special importance in evaluating a high solids clay slurry for the aforementioned coating purposes.

Many crude kaolin clays are unsuitable for the production of grades of kaolin for use in the paper and paperboard coating industry. There are numerous causes of unsuitability such as the failure of off-color crudes to respond to known methods of bleaching and beneficiation. Another cause is the failure of crudes to yield products with good flow characteristics, in aqueous suspension, as demanded by the paper and paperboard coating industry for operational reasons. With reference to flow characteristics there are several causes of poor viscosity some of which are not understood. Evidence thus far gathered suggests that one cause of poor viscosity is minute aggregates of kaolin particles which are too small to be removed by normal sedimentation practices, and which are not dispersed by normal practices. One aspect of this invention relates to the fractionation of such crudes so as to yield a fraction which is substantially free from such aggregates and, consequently, has suitable flow properties for use in paper and paperboard coating.

It should be understood that the flow properties demanded by the paper coating industry have become more stringent. This is primarily due to the increase in coating solids and to the development of coating methods which involve high rates of shear during the application of the coating to the paper. This is recognized by TAPPI and indeed the mentioned TAPPI Method T 648, su 72, incorporated a high-shear method of measuring viscosity when it was revised in 1972.

It is well known that, in addition to having suitable flow properties the kaolin pigments must satisfy the papermaker relative to the gloss, brightness, and printing properties of the finished coated product. Gloss and printing properties are associated with the particle size distribution of the clay particles and in the production of coating clays the particle size of the finished product can be controlled by fractionating the clay, such as by the method disclosed in Maloney, U.S. Pat. No. 2,158,987. However, methods such as those of Maloney do not yield a fraction of good viscosity when applied to a crude of poor viscosity.

In accordance with the foregoing, it may be regarded as an object of the present invention, to provide a method which yields a product of acceptable high-shear viscosity and of the desired particle size, from a poor viscosity crude.

It is a further object of the present invention, to provide a method for beneficiating a kaolin clay to improve the high-shear viscosity of a high solids suspension subsequently formed from the beneficiated pigment.

It is a still further object of this invention to provide a method as aforesaid, which simultaneously improves the size characteristics of the clay, to markedly decrease the proportion of the clay particles which may have deleterious size or shape characteristics.

SUMMARY OF INVENTION

Now, in accordance with the present invention, the foregoing objects and others as will become apparent in the course of the ensuing specification, are achieved in a method wherein a 10 to 20% solids aqueous suspension of a kaolin clay is subjected to a selective rheological separation, by mixing the suspension with from about 0.001% to 0.1% by weight of dry clay, of a high molecular weight anionic polymer. The treated suspension is then allowed to separate into a sedimented phase, and a supernatant phase which is found to be substantially free of aggregates. The supernatant phase containing the beneficiated kaolin pigment in suspension is then separated from the sedimented phase. The suspended product of the process can then be conventially processed, e.g., bleached, flocced, filtered and washed, then re-dispersed and dried or mixed with previously prepared dry material, to yield a high solids (e.g. 60% to 75% solids) coating slurry.

In a typical procedure wherein the initial starting material is a crude sedimentary kaolin clay including from about 1–2% titania, the said crude is first subjected to a separation process to reduce the titania content to below 0.8% by weight—more generally the titania will be reduced to the range of from about 0.2 to 0.8%. Where a froth flotation process is used for such purposes, the clay may be initially blunged and conditioned by forming an aqueous alkaline dispersion of the clay (pH adjusted to about 7–10 with ammonium hydroxide). The dispersion may include as a deflocculating agent, various compounds known to be useful for such purposes. A preferred agent for such purposes is sodium silicate. Other useful agents include a water soluble salt of a polyacrylic acid or polymethacrylic acid, preferably having an average molecular weight in the range of 500–10,000. Oleic acid or other collector agent is added during the conditioning process. Reference may be had to U.S. Pat. No. 3,974,067 for further details of flotation procedures which may be utilized in this aspect of the invention.

Further aspects of flotation treatment of the aforementioned type can be found in numerous places in the prior art, including in Cundy, U.S. Pat. No. 3,450,257; and in U.S. Pat. Nos. 2,990,958 and 3,138,550.

The purpose of the froth flotation in the foregoing sequence is to remove titania; and accordingly other techniques can be utilized in place of, or to supplement flotation, including by passing the slurry in relatively dilute form (typically at about 30% solids) through a high intensity magnetic field, e.g. via a magnetic separator of the type disclosed in Marston, U.S. Pat. No. 3,627,678. Such device comprises a canister packed with stainless steel wool, at which enveloping magnets are capable of providing a high-intensity field of 12 kilogauss or higher.

Reference may further be had in the above connection to the cited U.S. Pat. No. 3,974,067 to Alan J. Nott, which patent is assigned to the assignee of the present application. In this patent a method is disclosed for brightening a kaolin clay to remove discoloring contaminants, including titania, by subjecting the clay as an aqueous slurry to a froth flotation treatment, and subsequently to a magnetic separation in a slurry-pervious ferromagnetic matrix of the type described in the aforementioned patent to Marston.

The fraction obtained from the previously described process is, if necessary, diluted to less than 20% solids by weight (preferably to 10% to 15% solids), and is then subjected to the central step of the present process, i.e. to a selective rheological separation, utilizing an appropriate high molecular weight anionic polymeric flocculant. Typically the said anionic polymeric flocculant is added at a dose in the range of from about 0.001% to 0.1% by weight (of dry clay in the suspension), with agitation just sufficient to completely disperse the polymer throughout the clay slip.

Within minutes (typically less than 5 minutes per inch of slurry depth), the slip is found to separate into two phases: a fluid and dispersed supernatant phase, and a flocculated, sedimented phase. The supernatant phase, which includes the beneficiated kaolin, is readily separated from the sediment and may be processed separately. The subsequent treatment of this separated phase is then relatively conventional, and may typically include acid flocculation, bleaching with sodium hydrosulfite, filtration, washing, redispersing, and drying or mixing with previously beneficiated dry material.

When a high solids slurry based upon the refined clay of the supernatant phase is examined from a rheological viewpoint, it is unexpectedly and surprisingly found to have extremely low values of high shear viscosity relative to the starting clay, and particularly relative to the clay in the sedimented phase. Examination of the beneficiated clay by electron microscopy establishes that it is substantially free of aggregates, which structures have apparently been relegated to the sedimented phase by the process of the invention. As will be discussed further hereinbelow, this is hypothesized to be at least one of the mechanisms responsible for the remarkable improvements enabled by the invention.

In a further aspect of the invention it is found that where the starting dilute suspension includes a 100% less than 5 micron clay, the fraction of clay recovered in the supernatant phase has extremely fine particle size. Typically 90% to 100% by weight of the particles thereof have an E.S.D. less than 2 microns. Thus the process of the invention also serves to beneficially alter the size characteristics of the suspension as to improve the coating properties of the clay.

It is important to observe here that the size separation which occurs as an incident of the polymer treatment, and which is normally highly beneficial, can in no way fully account for the remarkable rheological improvements yielded by the invention. Thus, and as will be hereinafter illustrated, a given kaolin clay can be classified by centrifuging to provide a fraction having a size distribution as above; yet such fraction will lack the rheological characteristics yielded when the same clay is processed by the method of the invention.

The anionic polymeric flocculants which are advantageously used in the method of the invention, are preferably characterized by charge densities of 25% or higher and a molecular weight of over $10^7$. Typical such molecular weights are, e.g., of the order of 10 to 15 million. Typical such compounds utilizable in the invention include highly anionic polymers such as polyacrylamides or derivatives of same. Among the compounds of this type commercially available and utilizable in the invention are those produced by Nalco Chemical Company, Oak Brook, Ill., and commercially available in the U.S. under designation such as Nalco 7873, and Nalco 9UD120; and the Percol 156 product, produced by Allied Colloids Incorporated, Ridgewood, N.J.

It may be noted here that in Rowland, U.S. Pat. No. 2,981,630, poly-aliphatic-hydroxy polymers or carbohydrate polymers, and most especially water suspensible derivatives such as manno-galactans, are disclosed for separating a clay suspension into components having different viscosities by selectively flocculating one or more said components. In this teaching, however, the low viscosity component is precipitated, while the more viscous fraction remains in the supernatant liquid. There is no indication that high shear rheology is improved. The mechanism of the Rowland disclosure is believed to differ fundamentally from the present invention, with the distinctions being partially due to the chemically distinct nature of the polymers used in the two instances.

It may be further noted, that it has heretofore been known to utilize high molecular weight anionic polymeric flocculants of the general type used in the present invention, including certain polyacrylamides, in the course of treatment of clay slurries to effect certain separations in same. However, it is noteworthy to observe that such prior art treatments have considered solely the utility of such flocculants for removal of discoloring contaminants from the clay slurry. None have taught the utility or application of the said flocculants for the separation of clay fractions from clay fractions, wherein such fractions are further, possessed of markedly different rheological properties.

Reference may be had in the foregoing connection to U.S. Pat. No. 3,808,021 to R. N. Maynard, wherein a kaolin slurry which has previously been reflocculated by use of excess peptizing agent, is treated with an anionic high molecular weight polymer to form flocs of purified kaolin clay, which settle, leaving titanium and iron contaminants in suspension. Reference may also be had to the same inventor's U.S. Pat. No. 3,857,781, wherein a similarly reflocculated and aged kaolin slurry, is treated with an anionic high molecular weight polymer in the presence of specified inorganic salts. In this instance, the flocs which settle out from the suspension include the titanium and iron contaminants, leaving the brightened kaolin in suspension.

The precise mechanisms at work in achieving the highly beneficial results yielded by the present invention are, at present, only imperfectly understood. While applicant does not intend to be bound by any theory of the invention, evidence thus far gathered (in part by use of scanning electron photomicroscopy) suggests that the highly anionic polymer functions in the present invention to selectively flocculate aggregates of very minute kaolin platelets, thereby removing these elements from the suspension to render same substantially free of aggregates, and leaving substantially discrete kaolin platelets remaining in the suspension, with the highly improved rheological properties being thereby yielded.

In the terminology set forth in the preceding paragraph, applicant intends the phrase "aggregates" to refer to two types of kaolin structures wherein groups of kaolin platelets are associated. In the type "A" aggregate, the clay platelets are substantially arranged in neatly stacked, one-atop-the-other order. In the type "B" aggregate, the stacks of platelets are skewed, i.e., a relatively complete overlap between successive overlying platelets is absent. In this type "B" aggregate a certain amount of edge-to-edge contact in the platelets thus occurs. An analogy might be made with a deck of ordinary playing cards. If the deck is perfectly squared off, the arrangement is comparable to the "A" aggregate. If the same deck is spread out or skewed about, then an arrangement results which is more nearly akin to the type "B" aggregate.

In any event, in the instance of both the type "A" and "B" aggregates, it will be clear that, in comparison to the situation where relatively small numbers of platelets are bound to each other, or where platelets are substantially free from one another, one effectively has an increased collection of platelet edges relative to outwardly accessible faces. In view of the known fact that kaolin platelet faces carry negative charges, while the edges thereof carry positive charges, it will be clear that the aggregates will possess a higher proportion of positive-to-negative charge than will isolated platelets or small collections of platelets. Therefore, using an anionic high molecular weight polymer, the aggregates are attracted to the long-chain polymer, which polymer tends to tie up a large number of such aggregates, in consequence of which the resultant flocs settle out of the suspension.

In accordance with a further aspect of the invention, it is found that the benefits of the present process are applicable to a kaolin clay which has already been highly refined, i.e., refined to the extent of being of relatively fine particle size, and which by virtue of low titania and iron content, already constitutes a highly whitened and brightened pigment. Thus, it is possible, in accordance with this aspect of the invention, to utilize as a "starting material" the already highly brightened and purified pigment produced by prior art processes, which may have included flotation and/or magnetic separation treatment of crude kaolins and/or various classification and bleaching steps—to have already resulted in a pigment of relatively good coating qualities. By use of the present invention, however, i.e., by subjecting such materials to a selective rheological separation by the method of the invention, the high shear viscosity is greatly improved and the size distribution properties, i.e. the fineness of the clay, may be substantially further improved.

In a presently preferred and commercially advantageous embodiment of the invention, the kaolin clay which is to be subjected to the rheological separation, is continuously processed so as to obtain therefrom a fraction having a value of high-shear viscosity in high-solids suspension which is low relative to that of a high-solids suspension prepared from the the starting clay, by the steps of forming the kaolin clay into a dilute aqueous suspension having from 10% to 20% solids by weight and forming said suspension into a continuous flow stream; mixing the stream of flowing suspension at a given point with from about 0.001% to 0.1% by weight of dry clay, of a high molecular weight anionic polyacrylamide polymer or derivative thereof, to selectively flocculate aggregates of minute kaolin platelets; and continuously separating the flowing and treated suspension downstream of the mixing point, into a sedimented phase containing a clay fraction of relatively high high-shear viscosity characteristics, and a supernatant phase which is substantially free of aggregates and which contains in suspension as product, a fraction of the clay possessing relatively low high-shear viscosity properties.

In this continuous mode of processing, the stream of polymer-treated flowing suspension can be separated by passing same through a continuous flow sedimentation means. A preferred such device is an inclined plate gravity settler such as the "Lamella" gravity settler apparatus available from Parkson Corporation, Fort Lauderdale, Fla. This device consists of series of parallel inclined plates, and when in operation, the space between the plates is full of slurry. The feed is dosed with the polymer in a flash mixing tank which precedes the parallel inclined plates. The feed then enters and is passed in continuous fashion between the plates in a non-turbulent manner, and as it separates into a light and heavy phase, the light phase moves upward in contact with the plate above and the heavier phase moves downward in contact with the plate below. At the upper ends of the plates the light product (i.e. the supernatant phase including the desired product) overflows; and at the lower end of the plates the heavier (i.e. the sedimented) phase collects in a zone from which it is withdrawn. Arrangements are provided for controlling the rate of flow of the feed and the rate of the flow of the underflow, and the operator sets the controls to optimize the throughput and the percentage yield.

The continuous flow sedimentation means can also comprise a continuous flow sedimentation tank, such as the "Enviroclear" product of Dorr-Oliver Inc., Stamford, Conn. This type of device consists of a tank having a weir at the top, a conical bottom provided with an outlet, and an input portion for feeding the tank toward the center thereof (i.e. at midheight). Thus when the treated flowing suspension of the present invention is fed into such a tank, the supernatant phase bearing the product emerges via the weir as overflow; and the sedimented phase settles to the conical bottom from whence it is withdrawn.

DESCRIPTION OF PREFERRED EMBODIMENT

Figure 1:
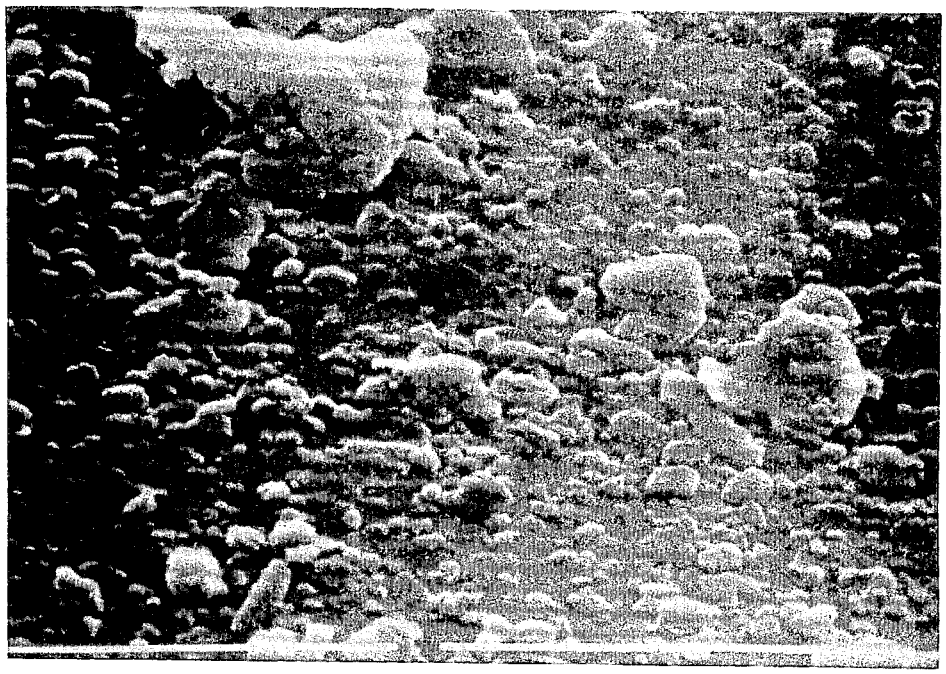
FIG. 1 herein is an electron photomicrograph of a clay suspension, representing the supernatant phase resulting from treatment of a kaolin clay by the process of the present invention.

The invention is further illustrated by the following Examples:

EXAMPLE I

In this Example the selective rheological separation method of the present invention was practiced, utilizing as starting material samples obtained from a plant processing stream normally utilized to produce a high quality, fine particle size, and highly brightened coating clay from a mixture of relatively fine particle size sedimentary soft Georgia kaolin crudes. The mixture of crudes initially included by weight approximately 1.5% titania and 0.75% of iron expressed as $Fe_2O_3$.

These crudes, in the usual plant processing procedure, are subjected to blunging, refining, and conditioning as aforementioned, and, thence, to a froth flotation, which reduces the titania content to between 0.2 and 0.4%. A product from such processes was diverted from the plant processing stream for use in the present Example. Normally such material would proceed through the conventional flocculating, bleaching, filtering, and redispersion steps, which would result in a final product brightness exceeding 90%. The size distribution resulting from this conventional processing would generally be such that 95% by weight of the particles are of less than 2 microns E.S.D.

Initially, a sample (A) was so diverted, and processed as to constitute a control. In particular, the said sample was flocced with $H_2SO_4$, then reductive bleached, and then filtered and washed. The filter cake was dispersed and the sample was then screened, and spray-dried.

A second portion of the above starting material was diluted to 11.0% solids using deionized water. The diluted slip was then treated with 0.01% of an anionic acrylamide polymer, viz. the Nalco 9UD120 polymer. The treated suspension was allowed to age 5 minutes per inch of slip. After aging, the sediment (Sample B) and supernatant (Sample C) phases were separated by siphoning off the supernatant phase.

The recovery of clay in the supernatant phase totaled approximately 54.5%. The sediment (Sample B) and the supernatant phase (Sample C) were then individually flocced with $H_2SO_4$ to pH 3.0, bleached with 0.35% sodium hydrosulfite, filtered, washed and then spray dried. In Table I, hereinbelow, the results yielded for each of the three samples A, B, and C are set forth. More specifically, surface area, PSD, and viscosity data is tabularized for each of the said samples:

TABLE I

| SAMPLE | SURFACE AREA $m^2/g$ | PARTICLE SIZE DISTRIBUTION (PSD) (in microns) | | | | | | VISCOSITY* | | |
| --- | --- | --- | --- | --- | --- | --- | --- | --- | --- | --- |
| | | $-10$ | $-5$ | $-2$ | $-1$ | $-\frac{1}{2}$ | $-\frac{1}{4}$ | Brookfield in cps at 20 rpm | High Shear in Dyne-cm $\times 10^5$ | High Shear* in cps |
| A (control) | 19.43 | 100 | 100 | 95 | 86 | 74 | 53 | 380 | 18 @ 3380 rpm | 101.7 |
| B (sediment) | 19.11 | 100 | 100 | 90 | 73 | 56 | 35 | 540 | 18 @ 620 rpm | 554.5 |
| C (supernatant) | 25.58 | 100 | 100 | 100 | 96 | 88 | 64 | 510 | 6.2 @ 4400 rpm | 26.9 |

*Viscosity measurements are in accordance with TAPPI Method T648 su-72 (revised-1972).

**High Shear in cps = $\frac{dynes \times 19100}{RPM}$

To be noted in Table I is that a most substantial improvement in all significant coating characteristics has been achieved in the sample C, which has been processed in accordance with the invention. This in comparison to sample A, which sample already represents a very high quality product. Thus, the considerable improvement in particle size distribution (PSD) is evidenced by the much higher surface area achieved in sample C. The PSD shows that 96% by weight of the sample C particles are of less than 1 micron E.S.D., with 100% less than 2 microns, as compared to the 86% and 95% control sample A. Also to be noted is the extremely fine particle sizes in sample C: 88% by weight are less than $\frac{1}{2}$ micron E.S.D. and 64% by weight are of less than $\frac{1}{4}$ micron E.S.D., as compared to 74% and 53% for the same properties in sample A.

But perhaps the most dramatic and startling improvement may be noted in the viscosity data. Here it is emphasized that it is the high shear viscosity which is of particular significance for present (coating) purposes. And in this instance, it is seen that the high shear viscosity in centipoise for sample C is of the order of $\frac{1}{4}$ of that sample A. It should, incidentally, be pointed out that the increase in Brookfield viscosity, which sample C displays in comparison to sample A, is not considered of significance for present purposes.

Table I also illustrates that the separated sedimented phase (sample B) indeed possesses properties for coating purposes which are of comparatively less value than those of the control sample, and far inferior to those of sample C. Thus, it will be evident, in accordance with the invention, that a true selective separation of clay from clay has been effected, with the separated fractions having markedly different properties in regard to viscosity properties as same are measured by the critically important high shear viscosity test, and also different properties as respects the PSD and surface area.

The electron photomicrograph of FIG. 1, shows a portion of the supernatant phase recovered from a selective rheological separation conducted on samples processed in accordance with the procedure set forth in this Example. The photomicrograph (which incorporates a size scale) clearly depicts the substantial absence of aggregates in the supernatant phase, which is thus seen to be comprised essentially of individual clay platelets.

Figure 2:
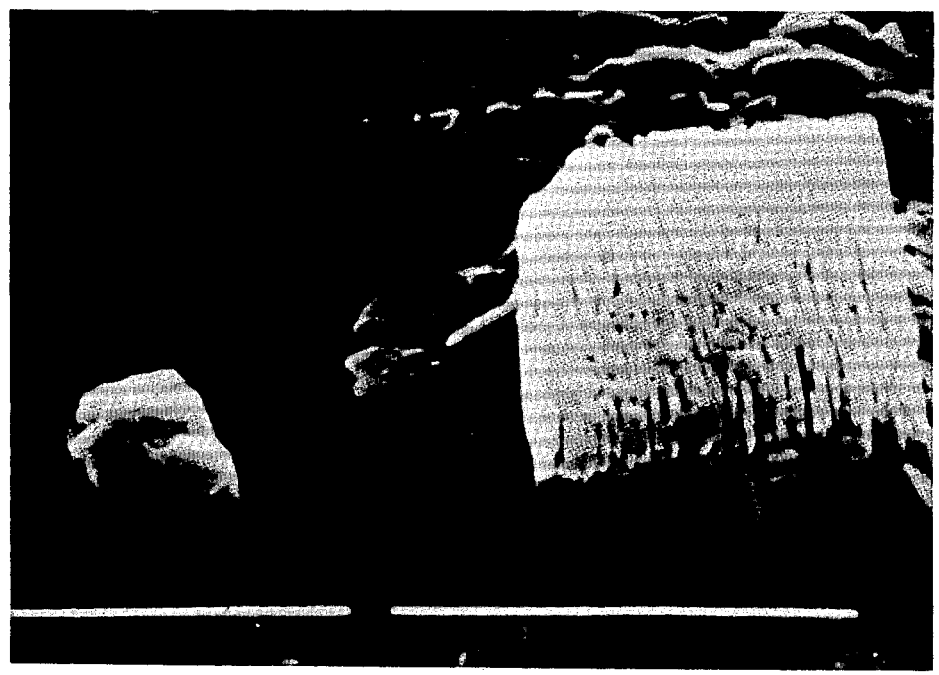
FIG. 2 is a further electron photomicrograph, showing type "A" aggregates which have accumulated in the sedimented phase resulting from treatment of a kaolin clay by the process of the invention.

The electron photomicrograph of FIG. 2, shows a portion of the sedimented phase recovered from the specifically, there is tabularized surface area, PSD, and viscosity data for each of the said samples.

TABLE II

| SAMPLE | SURFACE AREA m²/g | PARTICLE SIZE DISTRIBUTION (PSD) (in microns) | | | | | | VISCOSITY | | |
|---|---|---|---|---|---|---|---|---|---|---|
| | | −10 | −5 | −2 | −1 | −½ | −¼ | Brookfield in cps at 20 rpm | High Shear in Dyne-cm × 10⁵ | High Shear in cps |
| | | % | | | | | | | | |
| A (Control) | 22.63 | 100 | 96 | 87 | 76 | 66 | 47 | 450 | 18 @ 1880 rpm | 182.8 |
| B (Supernatant) | 26.70 | 100 | 100 | 99 | 93 | 85 | 68 | 790 | 18 @ 3160 rpm | 108.7 |
| C (Sediment) | 18.66 | 99 | 95 | 71 | 53 | 44 | 32 | 690 | 18 @ 280 rpm | 1227.8 |
| D (Sediment & Ozone) | 18.17 | 100 | 96 | 71 | 52 | 41 | 30 | 580 | 18 @ 280 rpm | 1227.8 |

Notes:
All test procedures are as in Example 1.
Recovery of clay in the supernatant phase was 56.7%.

said selective rheological separation. Again in this instance, the scale of the photomicrograph is set forth in the Figure. The very large body appearing at the right center of the photomicrograph, is a type "A" aggregate, consisting of neatly stacked individual platelets. Among other features to be noted is the occurrence of the small negative plates attached to the positive edges of this large aggregate.

Figure 3:
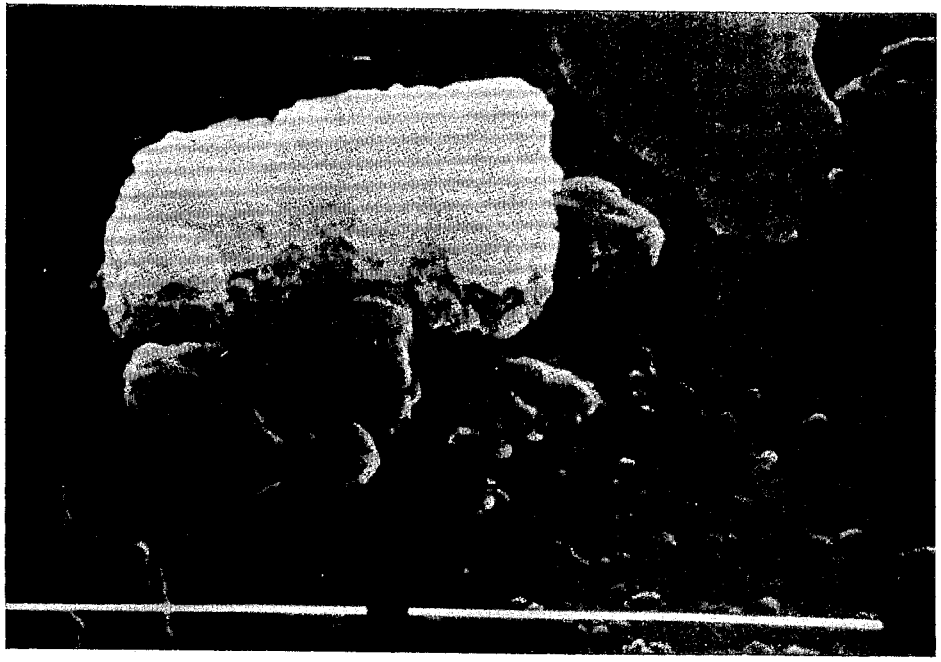
FIG. 3 is a yet further electron photomicrograph, showing type "B" aggregates which have accumulated in the sedimented phase resulting from treatment of a kaolin clay by the process of the invention.

FIG. 3 is a further electron photomicrograph which shows another portion of the sedimented phase recovered from the selective rheological separation. In this photomicrograph, a large type "B" aggregate is very clearly depicted. The skewed relationship of the individual platelets which comprise this aggregate may be clearly seen.

EXAMPLE II

In this Example the selective rheological separation method of the invention was practiced, again utilizing as starting material specimens diverted from a plant production stream normally utilized to produce a high quality fine particle size and highly brightened coating clay from a mixture of fine particle-sized sedimentary soft Georgia kaolin crudes.

A first said specimen of the floated and refined slip, was processed exactly as was sample A in Example I, i.e. in this Example the resulting sample A served as a control in exactly the manner of sample A in Example I.

A second said specimen was diluted to 11.0% solids using deionized water. The diluted slip was then treated with 0.0075% of the aforementioned Nalco 9UD120 polymer. This was then allowed to stand unagitated for 1 hour. Afterwards, the supernatant phase and the sediment phase were separated by siphoning off the supernatant phase. The supernatant phase (sample B) was flocced to 3.0 pH using $H_2SO_4$, then bleached with 0.35% sodium hydrosulfite, filtered, washed, dispersed and dried.

A portion of the sediment phase obtained from the above procedure (sample C), was treated as was sample B in Example 1.

A further portion of the sediment from the selective rheological separation step of this Example was also treated with gaseous ozone, by bubbling the ozone as a fine dispersion through a well-agitated suspension of the sediment. This further sample (D) was then processed exactly as was the sediment in sample C.

In Table II hereinbelow, the results yielded for each of the five samples A, B, C, and D are set forth. More The data of Table II clearly supports the findings of Table I, and further illustrates the remarkable improvement in high-shear viscosity which is yielded by practice of the present invention.

The objective of the ozone treatment in preparing sample D was to destroy the organic polymeric flocculant in order to demonstrate that the relatively poor rheology of the sedimented phase is not due to residual effects of the polymeric flocculant. Comparison of sample C with sample D in Table II, will bear out that this is indeed the case; i.e. this further confirms that a true rheological separation is achieved by the process of the invention.

EXAMPLE III

The present Example illustrates that simple classification of particle size by sedimentation, in no way results in a product having viscosity characteristics similar to those yielded by the selective rheological separation technique of the present invention.

In this Example, a floated No. 2 clay fraction was diverted from the plant processing stream. A first sample thereof (A) was processed as were the (A) samples in prior Examples.

A further sample (B) of the starting material was processed as was sample A, except that the product was refined to 90% less than 2 micron fraction by centrifuging prior to floccing, bleaching, filtration, washing, redispersion and spray-drying. Subsequently, the viscosity, PSD, and surface area were determined for the sample.

A further sample (C) of the starting material was processed as sample B, except the sample in this instance was cut by the centrifuge to 98% less than 2 microns.

A further portion of the original sample was diluted to 11.0% solids, then subjected to a selective rheological separation by treating with 0.0075% of the aforementioned Nalco 9UD120 polymer (0.25% weight/volume solution). The sample was then allowed to sit and age quiescently for 5 minutes per inch of slip. After aging, the supernatant phase was siphoned off into a separate container, leaving the sediment undisturbed.

A portion (sample D) of the supernatant phase was flocced to a 3.0 pH using a 10% weight-to-volume solution of sulfuric acid, then bleached using 0.35% by weight sodium hydrosulfite, then allowed to age for 30 minutes, filtered, and washed. The filtered cake was dispersed as with prior samples, then screened, diluted and spray-dried, after which the said characteristics for prior samples were determined.

A portion of the sediment phase sample (E), was flocced to a 3.0 pH using sulfuric acid and bleached, filtered and washed as with prior samples. Following filtration the filter cake was dispersed as with prior samples, screened, spray dried and the aforementioned viscosity, PSD, and surface area characteristics determined.

In Table III hereinbelow, the results yielded for each of the samples (A through E) of this Example are set forth:

Table IV sets forth the resulting measurement data for the samples, where the measured parameters are as discussed in prior Examples. It will be particularly noted that the polymer dose is effective over the entire range utilized in these Examples:

TABLE IV

| Sample | Brightness | Recovery % | Particle Size Distribution % < stated size (μ) | | | | | Viscosity Brookfield cps | Hercules dynes @ rpm | cps |
|---|---|---|---|---|---|---|---|---|---|---|
| | | | 5 | 2 | 1 | ½ | ¼ | | | |
| A (Control) | 90.3 | — | 99 | 94 | 87 | 73 | 44 | 430 | 18 @ 2820 | 122 |
| B (.001% polymer) | 89.6 | 82 | 100 | 98 | 92 | 73 | 53 | 390 | 11.8 @ 4400 | 51 |
| C (.002% polymer) | 89.7 | 74 | 100 | 98 | 92 | 79 | 58 | 410 | 11.3 @ 4400 | 49 |
| D (.003% polymer) | 90.1 | 73 | 100 | 98 | 95 | 84 | 60 | 420 | 7.7 @ 4400 | 33 |

TABLE III

| SAMPLE | SURFACE AREA m²/g | PARTICLE SIZE DISTRIBUTION (PSD) (in microns) % | | | | | | VISCOSITY Brookfield in cps at 20 rpm | High Shear in Dyne-cm × 10⁵ | High Shear in cps |
|---|---|---|---|---|---|---|---|---|---|---|
| | | −10 | −5 | −2 | −1 | −½ | −¼ | | | |
| A (Control) | 18.83 | 98 | 94 | 81 | 71 | 57 | 36 | 210 | 18 @ 2380 rpm | 144.4 |
| B (Centrifuged) | 18.79 | 100 | 99 | 89 | 79 | 65 | 43 | 270 | 18 @ 2280 rpm | 150.7 |
| C (Centrifuged) | 22.61 | 100 | 100 | 99 | 95 | 83 | 56 | 580 | 18 @ 2200 rpm | 156.2 |
| D (Supernatant) | 24.29 | 100 | 100 | 99 | 96 | 86 | 64 | 500 | 9.2 @ 4400 rpm | 39.9 |
| E (Sediment) | 12.31 | 95 | 83 | 57 | 42 | 29 | 17 | 250 | 18 @ 420 rpm | 818.5 |

Notes:
All test procedures are as in Example I.

The data in Table III further illustrates that the remarkable improvement in viscosity characteristics yielded by the present invention, are in no way dependent solely upon the particle size distribution changes achieved by the invention.

EXAMPLE IV

In this Example, selective rheological separations in accordance with the invention were effected at substantially lower polymer concentrations than in prior examples.

An initial sample of plant floated fine No. 1 fraction clay slip was flocced with acid, filtered, washed, then dispersed and spray-dried. This material constituted a control sample (sample A).

A portion of the slip above described, was treated with 0.001% by weight of dry clay of the aforementioned Nalco polymer 9UD120. The treated material was allowed to separate, and the dispersed supernatant phase was recovered, flocced, bleached, filtered, washed, dispersed and dried as was the control sample A. The resulting material is identified as sample B.

A third sample (C) was prepared as described for sample B, except that the polymer dose was 0.002%.

A fourth sample (D) was prepared as were the previous samples, except that the polymer dose was 0.003%.

EXAMPLE V

Whereas many of the prior Examples herein utilize relatively fine particle sized input materials for treatment by the selective rheological process of the present invention, this Example considers treatment of somewhat coarser materials.

In particular, samples of a No. 2 grade plant floated slip, as described in the prior Example, were classified to (A) 83; (B) 93; and (C) 100% finer than 2 microns. These samples A, B, and C, were subsequently flocced, bleached, filtered, washed, dispersed and dried. In each instance brightnesses, particle size distribution and viscosities were determined, whereby to serve as controls.

Utilizing further portions of plant floated slip which had been classified to 83% less than 2 microns, further samples D, E, F, and G were prepared by treating such slip portions with the Nalco polymer 9UD120, then allowing the slip to separate, recovering the supernatant phase, then floccing, bleaching, filtering, washing, dispersing and drying—as in the controls. The polymer doseages were D—0.001%; E—0.003%; F—0.005%; and G—0.0075% Nalco 9UD120 by weight of the dry clay. The resulting data is set forth in Table V, from which it will be evident that the selective rheological separation of the invention is fully effective with the coarser slip. To be noted is that the high shear vicosity characteristics are substantially better for all of samples D, E, F, and G, as compared even to control sample C. Also to be observed is that the size distribution for the samples D through G indicates coarser materials than e.g., control sample C; but nonetheless highly significant improvements in viscosities are evidenced. This again demonstrates that the rheological improvements yielded by the invention are in no way a simple consequence of the size separation which is an incident of the present selective rheological separation process.

TABLE V

| Sample | Brightness | Recovery % | Particle Size Distribution % < stated size (μ) | | | | | Viscosity Brookfield cps | Hercules dynes @ rpm | cps |
|---|---|---|---|---|---|---|---|---|---|---|
| | | | 5 | 2 | 1 | ½ | ¼ | | | |
| A (83% < 2m) | 89.9 | 85 | 97 | 83 | 74 | 61 | 41 | 280 | 18 @ 1920 | 179 |
| B (93% < 2m) | 91.1 | 70 | 100 | 93 | 80 | 70 | 52 | 630 | 18 @ 1600 | 215 |
| C (100% < 2m) | 90.6 | 40 | 100 | 100 | 100 | 96 | 67 | 1060 | 18 @ 1400 | 246 |
| D (.001% polymer) | 90.4 | 72 | 100 | 90 | 80 | 67 | 46 | 480 | 18 @ 3000 | 115 |
| E (.003% polymer) | 90.6 | 67 | 100 | 94 | 84 | 71 | 48 | 520 | 18 @ 3320 | 104 |
| F (.005% polymer) | 90.7 | 65 | 100 | 96 | 87 | 73 | 47 | 620 | 18 @ 3300 | 104 |
| G (.0075% polymer) | 90.9 | 63 | 100 | 97 | 88 | 74 | 57 | 600 | 18 @ 3620 | 95 |

EXAMPLE VI

In this Example, three different polymers were evaluated, to determine the effects of the ionic charge and molecular weight upon the selective rheological separation process of the present invention. In particular, the steps of the process were carried out using a nonionic, a moderately anionic, and a very highly anionic polymer.

Pursuant to the above, a sample product was diverted from the plant processing stream, and was treated with three different polymers, viz. Nalco 7871, a nonionic polymer with average molecular weight of 8 million; with Nalco 8UD574, a 100% anionic polymer, further characterized as having an average molecular weight of 15 million; and with Nalco 9UD120, a 26% anionic polymer, which has been described in prior Examples.

Figure 4:
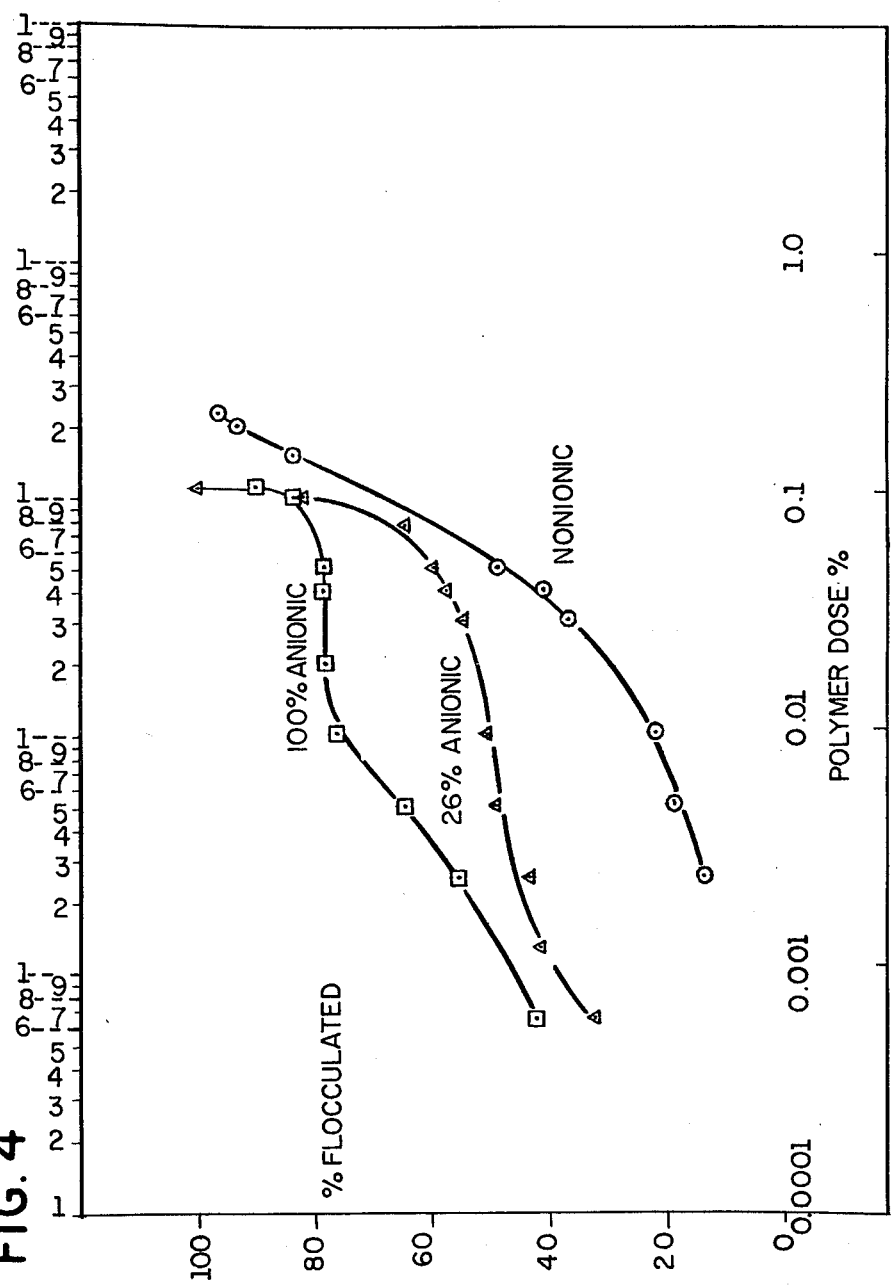
FIG. 4 is a graph plotting percentage of clay flocculated against polymer dose-rate for several polymers of differing degree of ionic charge and molecular weight.

Differing dosage levels of the three polymers were utilized in order to generate the curves of FIG. 4 herein, which shows the relationship between the specific polymer dose and the percentage of flocculation of the treated clay suspension.

Thus, in the first instance, a floated No. 2 clay fraction product was diluted to 11% solids, and 500 ml (58.9 g) of such product was treated with a 0.25% solution of the afore-mentioned 7871 polymer, utilizing dose rates of 0.0025%, 0.005%, 0.01%, 0.03%, 0.04%, 0.05%, 0.1%, 0.15%, 0.2% and 0.225%—all by weight of dry clay. The supernatant phase was siphoned off, then flocced, filtered and washed. The cake was dispersed for particle size distribution analysis, as described for the previous Examples.

A further such specimen was treated as described above, but with the Nalco 8UD574 polymer, also at various dosage rates.

A further sample was treated as above, but with the Nalco 9UD120 polymer.

In Tables VI(A), VI(B), and VI(C), data is tabulated for the three runs, i.e., using the different polymers:

TABLE VI(A)

| | Nonionic Polymer/Nalco 7871 | | | | | |
|---|---|---|---|---|---|---|
| DOSE % | RECOVERY (% of clay treated) | PARTICLE SIZE DISTRIBUTION (%) (in microns) | | | | |
| | | −5 | −2 | −1 | −½ | −¼ |
| .0 | 100 | 95 | 82 | 72 | 58 | 38 |
| .0025 | 86.7 | — | — | — | — | — |
| .005 | 87.2 | 98 | 91.0 | 82 | 68 | 42 |

TABLE VI(A)-continued

| | Nonionic Polymer/Nalco 7871 | | | | | |
|---|---|---|---|---|---|---|
| DOSE % | RECOVERY (% of clay treated) | PARTICLE SIZE DISTRIBUTION (%) (in microns) | | | | |
| | | −5 | −2 | −1 | −½ | −¼ |
| .01 | 78.6 | — | — | — | — | — |
| .03 | 63.9 | — | — | — | — | — |
| .04 | 60.0 | — | — | — | — | — |
| .05 | 51.8 | — | — | — | — | — |
| .10 | 20.7 | 100 | 96 | 84 | 70 | 36 |
| .15 | 16.6 | — | — | — | — | — |
| .20 | 6.9 | — | — | — | — | — |
| .225 | 3.6 | 100 | 98 | 96 | 90 | 44 |

TABLE VI(B)

| | 100% Anionic Polymer/Nalco 8UD574 | | | | | |
|---|---|---|---|---|---|---|
| DOSE % | RECOVERY (% of clay treated) | PARTICLE SIZE DISTRIBUTION (%) (in microns) | | | | |
| | | −5 | −2 | −1 | −½ | −¼ |
| .0 | 100 | 95 | 82 | 72 | 58 | 38 |
| .000625 | 58.0 | — | — | — | — | — |
| .00125 | 53.7 | — | — | — | — | — |
| .0025 | 44.9 | 100 | 99 | 98 | 88 | 60 |
| .005 | 36.1 | — | — | — | — | — |
| .01 | 23.9 | 100 | 99 | 98 | 92 | 65 |
| .02 | 22.1 | — | — | — | — | — |
| .04 | 21.8 | 100 | 100 | 99 | 95 | 66 |
| .05 | 21.5 | — | — | — | — | — |
| .10 | 17.5 | 100 | 100 | 99 | 98 | 80 |
| .11 | 10.9 | — | — | — | — | — |

TABLE VI(C)

| | 100% Anionic Polymer/Nalco 8UD574 | | | | | |
|---|---|---|---|---|---|---|
| DOSE % | RECOVERY (% of clay treated) | PARTICLE SIZE DISTRIBUTION (%) (in microns) | | | | |
| | | −5 | −2 | −1 | −½ | −¼ |
| .0 | 100 | 95 | 82 | 72 | 58 | 38 |
| .000625 | 67.6 | 99 | 94 | 86 | 72 | 48 |
| .00125 | 59.1 | — | — | — | — | — |
| .0025 | 56.7 | — | — | — | — | — |
| .005 | 50.7 | — | — | — | — | — |
| .01 | 50.1 | — | — | — | — | — |
| .03 | 46.1 | 100 | 99 | 98 | 94 | 62 |
| .04 | 43.2 | — | — | — | — | — |
| .05 | 40.8 | — | — | — | — | — |
| .075 | 36.2 | — | — | — | — | — |
| .10 | 18.5 | 100 | 98 | 97 | 94 | 74 |
| .11 | 0.0 | — | — | — | — | — |

In each instance the dosage, recovery, percentage flocculated of the solids, and the particle size distribution for the supernatant phase is set forth.

FIG. 4 plots the percentage by weight of dry clay flocculated against the polymer dose rate (on a semi-log scale) for the data tabulated in each of the aforementioned Tables, thus showing the effects on flocculation of each of the three polymers. From these plots it is readily seen that the nonionic polymer is non-selective, as the percent flocculation increases at a rate proportional to dose rate.

However, it is equally clear that the 26% anionic and 100% anionic polymers were selective—as is shown by the plots of dose rate verus flocculation. It is readily seen that with the 26% anionic polymer, a plateau was obtained, where further increase in dose resulted in very little additional flocculation. This plateau was particularly evident in the range of from about 0.006 to 0.03% by weight of the polymer. A relatively broad plateau and higher recovery are clearly advantageous under commercial processing conditions. Among other things, the broad plateau implies that dosage is not extremely critical over a fairly wide range.

EXAMPLE VII

In this Example, the effects of selective rheological separation pursuant to the invention were compared for two very different polymers, viz., the substantially non-ionic Nalco polymer 7871 previously referenced in Example IV, and the 26% anionic Nalco polymer 9UD120. Each of these polymers are classified as flocculants.

Samples of a fine No. 1 clay fraction were diverted from the plant processing line as referenced in the earlier Examples. A first such sample (A), was flocced to 3.0 pH using sulfuric acid, then bleached with 0.35% by weight sodium hydrosulfite, filtered, and washed with deionized water. The resulting filter cake was dispersed and spray dried. Following spray drying, PSD, surface area, and viscosity characteristics were determined for the resultant product.

A further sample (B) of the original fraction was diluted to 11% solids. The diluted slip was then treated with 0.02% of the mentioned Nalco 7871 polymer, based on dry clay. The polymer was mixed into the sample by pouring the treated slip from one container to another several times. The treated slip was then allowed to stand unagitated for 5 minutes per inch of slip. After this, the supernatant phase was siphoned off into a separate container, flocced to 3.0 pH using sulfuric acid, and bleached with 0.35% sodium hydrosulfite and allowed to age for 30 minutes, then filtered and washed. The filter cake was dispersed, screened, diluted and spray-dried, all as in the instance of Sample A, and thereupon the same characteristics of PSD, surface area, and viscosity were determined.

The same procedure as was used for Sample B was used for a third sample (C); but in this instance, the treating polymer was the aforementioned anionic Nalco 9UD120 at a dose rate of 0.0075%.

In Table VII hereinbelow, the data obtained pursuant to the above procedures for the three samples, A, B, and C, is tabulated:

TABLE VII

| PRODUCT | SURFACE AREA $m^2/g$ | PARTICLE SIZE DISTRIBUTION (PSD) (in microns) | | | | | | VISCOSITY | | |
|---|---|---|---|---|---|---|---|---|---|---|
| | | −10 | −5 | −2 | −1 | −½ | −¼ | Brookfield in cps at 20 rpm | High Shear in Dyne-cm × $10^5$ | High Shear in cps |
| A (control) | 22.2 | 100 | 100 | 96 | 88 | 78 | 57 | 340 | 18 @ 3780 rpm | 90.9 |
| B (non-ionic) | 22.54 | 100 | 100 | 96 | 89 | 77 | 52 | 370 | 18 @ 4200 rpm | 81.8 |
| C (anionic) | 24.93 | 100 | 100 | 96 | 98 | 92 | 69 | 380 | 5.8 @ 4400 rpm | 25.2 |

NOTES:
Supernatant phase recovery for Sample B was 86.5%; for Sample C, 54.1%
Test procedures are all as in prior Examples.

The data of Table VII establishes that the product B of treatment with the non-ionic polymeric flocculant, differs very little, if at all, from the control product A. Particle size distribution was substantially not affected, nor was rheology by treatment with the non-ionic polymeric flocculant. On the other hand, the anionic polymer yielded a selective separation treatment, resulting in the recovery (product C), of a product with extremely desirable rheological characteristics, i.e., with a very low high-shear viscosity; the very fine size characteristics are also deemed most desirable for coating purposes.

EXAMPLE VIII

In this Example, the method of the invention was practiced on a continuous commercial scale, utilizing as a continuous flow sedimentation means, the "Lamella" gravity settler apparatus of Parkson Corp., which has been previously described. The apparatus (as aforementioned) included a flash mix tank and flocculation tank in a section thereof which preceded the inclined parallel plate separator section. Treating polymer in the form of anionic Nalco 9UD120 was added to the in-line flow of suspension at the flash mix tank. Effluent from the apparatus (which included the product) was taken as overflow; the sedimented phase was removed continuously as underflow.

Typical average results over periods of steady operation are set forth in Table VIII. The polymer dosage throughout was 0.0075% of the dry weight of feed clay.

The yield at the lower flow rate in Table VIII was 24.7/41.2=60.0%, and that at the higher rate was 37.9/61.8=61.3%. In another study at 50 gal/min the yield fell to 54%.

The results in Table VIII may be compared with those reported in Table V, as the feeds used in Table VIII are similar to Sample B and the polymer dosage is the same as Sample G of Table V.

TABLE VIII

| | Rate of Flow in Gal/Min | Specific Gravity of Slurry | % Solid by wt. of Slurry | lb. of Clay/Min. | High-Shear Viscosity cps | Particle Size Distribution (% finer than) microns | | | |
|---|---|---|---|---|---|---|---|---|---|
| | | | | | | <2 | <1 | <0.5 | <0.25 |
| Feed | 30 | 1.10 | 15 | 41.2 | 296 | 93 | 85 | 73 | 46 |
| Rejects | 8.5 | 1.14 | 20 | 16.1 | 400 | 87 | 78 | 67 | 44 |
| Product | 21.5* | 1.084 | 12.7 | 24.7 | 118 | 98 | 93 | 82 | 49 |
| Feed | 45 | 1.10 | 15 | 61.8 | 215 | 94 | 86 | 75 | 46 |
| Rejects | 10 | 1.17 | 24 | 23.4 | 750 | 89 | 76 | 53 | 28 |
| Product | 35* | 1.082 | 12 | 37.9 | 89 | 98 | 93 | 85 | 60 |

*by difference.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A method for continuously processing a kaolin clay which has relatively poor high-shear viscosity when prepared as a high-solids suspension, so as to obtain therefrom a fraction having a value of high-shear viscosity in high-solids suspension which is low relative to the starting clay, thereby being desirable for use in coating of paper; the method comprises the steps of:

forming the kaolin clay into a dilute aqueous suspension having from 10% to 20% solids by weight and forming said suspension into a continuous flow stream; mixing the stream of flowing suspension at a given point with from about 0.001% to 0.1% by weight of dry clay, of a high molecular weight anionic polyacrylamide polymer or derivative thereof, to selectively flocculate aggregates of minute kaolin platelets; and continuously separating the flowing treated suspension downstream of the mixing point, into a sedimented phase containing a clay fraction of relatively high high-shear viscosity characteristics, and a supernatant phase which is substantially free of aggregates and which contains in suspension as product, a fraction of the clay possessing relatively low high-shear viscosity properties.

2. A method in accordance with claim 1, wherein the clay to be processed contains less than 0.8% by weight of titania.

3. A method in accordance with claim 2, wherein the clay of said dilute aqueous suspension has a particle size distribution such that substantially 100% by weight are of less than 5 microns E.S.D.

4. A method in accordance with claim 1, wherein the said stream of flowing suspension is separated by passing same through a continuous flow sedimentation means.

5. A method in accordance with claim 2, wherein said stream is separated by being passed through a continuous flow sedimentation tank.

6. A method in accordance with claim 4, wherein said stream is separated by being passed through a parallel inclined plate gravity settler.

7. A method in accordance with claim 6, wherein said supernatant phase is continuously recovered from said gravity settler as effluent overflow, and said sedimented phase is collected as underflow.

8. A method in accordance with claims 1, 6, or 5, wherein said polymer has a charge density of at least 25% and molecular weight greater than $10^7$.

9. A method in accordance with claims 1, 6, or 5, wherein said polymer has a change density of at least 25% and molecular weight is the range of 10 to 15 million.

10. A method in accordance with claims 1, 6, or 5, wherein the suspension subjected to said rheological separation has a solids content in the range of from 10% to 15%.

11. A method for treating a crude kaolin clay so as to obtain therefrom a fraction having a value of high shear viscosity in a high-solids coating suspension which is low relative to the starting clay, thereby being desirable for use in coating of paper; said method comprising the steps of:

blunging, dispersing, and conditioning a crude kaolin clay including from 1% to 2% by weight of discoloring titania, to form an aqueous suspension of same;

subjecting said blunged, dispersed, and conditioned suspension to froth flotation to reduce the titania content thereof below 0.8% by weight of the dry clay;

diluting a 100% less than 5 micron fraction from said flotation step to form an aqueous suspension including from 10% to 20% solids by weight, and forming said suspension into a flow stream;

mixing the stream of flowing suspension at a given point with from about 0.001% to 0.1% by weight of dry clay, of a high molecular weight anionic polyacrylamide polymer or derivative thereof, to selectively flocculate aggregates of minute kaolin platelets; and continuously separating the flowing treated suspension downstream of the mixing point into a sedimented phase containing a clay fraction of relatively high high-shear viscosity characteristics and a supernatant phase which is substantially free of aggregates and which contains in suspension as product, a fraction of said clay possessing relatively low high-shear viscosity properties.

12. A method in accordance with claim 11, wherein said polymer comprises a polyacrylamide or derivative thereof, which has a charge density of at least 25% and a molecular weight of over $10^7$.

13. A method in accordance with claim 12, wherein the suspension mixed with said polymer has a solids content in the range of 10 to 15%.

* * * * *